(12) United States Patent
Yim et al.

(10) Patent No.: US 10,645,454 B2
(45) Date of Patent: May 5, 2020

(54) APPARATUS FOR TRANSMITTING AND RECEIVING DYNAMIC MULTI-MODE SERVICE AND METHOD FOR PROVIDING THE SAME

(71) Applicant: ELECTRONICS AND TELECOMMUNICATIONS RESEARCH INSTITUTE, Daejeon (KR)

(72) Inventors: Hyun-Jeong Yim, Daejeon (KR); Soon-Choul Kim, Daejeon (KR); Byung-Jun Bae, Daejeon (KR); Hye-Ju Oh, Daejeon (KR); Heung-Mook Kim, Daejeon (KR); Hyoung-Soo Lim, Daejeon (KR); Nam-Ho Hur, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/599,390

(22) Filed: May 18, 2017

(65) Prior Publication Data

US 2017/0374421 A1  Dec. 28, 2017

(30) Foreign Application Priority Data

Jun. 22, 2016 (KR) ......................... 10-2016-0078220
Jan. 24, 2017 (KR) ......................... 10-2017-0010925

(51) Int. Cl.
*H04N 21/2362* (2011.01)
*H04N 21/435* (2011.01)
(Continued)

(52) U.S. Cl.
CPC ..... *H04N 21/4622* (2013.01); *H04N 21/2187* (2013.01); *H04N 21/21805* (2013.01);
(Continued)

(58) Field of Classification Search
CPC .............. H04N 21/434; H04N 21/8166; H04N 21/2343; H04N 21/4335; H04N 21/64322; H04N 21/26283; H04N 21/2187
(Continued)

(56) References Cited

U.S. PATENT DOCUMENTS 7,139,813 B1 * 11/2006 Wallenius .......... H04N 21/2225
                                                              709/219
2003/0002865 A1 * 1/2003 Matsui .............. H04L 29/06027
                                                              386/234
(Continued)

FOREIGN PATENT DOCUMENTS

KR            KR A         1/2010
   10-2010-0005877
KR        20120060014       6/2012
(Continued)

OTHER PUBLICATIONS

Byungjun Bae et al., "Dynamic Scheduled Broadcasting Service in Broadcast/Broadband Converged Networks," 2014 Korean Institute of Broadcast Engineers Summer Conference, Jun. 2014, pp. 144-145, Korea.

*Primary Examiner* — Mushfikh I Alam

(57) ABSTRACT

Disclosed are a dynamic multi-mode service (MMS) transmission apparatus, a dynamic MMS reception apparatus, and a method for providing a dynamic MMS. The method includes generating, by the dynamic MMS transmission apparatus, signaling information including information about linkage between service channels based on broadcast schedule information about a broadcast service; transmit-
(Continued)

ting, by the dynamic MMS transmission apparatus, the signaling information and the broadcast service to the dynamic MMS reception apparatus through at least one of a broadcast network and a broadband network; receiving, by the dynamic MMS reception apparatus, the signaling information and the broadcast service; interpreting, by the dynamic MMS reception apparatus, the information about the linkage between service channels, included in the signaling information, by decoding the signaling information; and providing, by the dynamic MMS reception apparatus, the broadcast service by performing dynamic channel switching based on the information about the linkage between service channels.

17 Claims, 10 Drawing Sheets

(51) Int. Cl.
| | | |
|---|---|---|
| | *H04N 7/173* | (2011.01) |
| | *H04N 21/462* | (2011.01) |
| | *H04N 21/434* | (2011.01) |
| | *H04N 21/2665* | (2011.01) |
| | *H04N 21/6587* | (2011.01) |
| | *H04N 21/262* | (2011.01) |
| | *H04N 21/81* | (2011.01) |
| | *H04N 21/218* | (2011.01) |
| | *H04N 21/2187* | (2011.01) |
| | *H04N 21/2668* | (2011.01) |

(52) U.S. Cl.
CPC ..... *H04N 21/2362* (2013.01); *H04N 21/2665* (2013.01); *H04N 21/2668* (2013.01); *H04N 21/26233* (2013.01); *H04N 21/435* (2013.01); *H04N 21/4345* (2013.01); *H04N 21/6587* (2013.01); *H04N 21/816* (2013.01)

(58) Field of Classification Search
USPC ......... 725/110, 44, 27, 37, 118, 91, 24, 131, 725/151
See application file for complete search history.

(56) References Cited

U.S. PATENT DOCUMENTS

| | | | |
|---|---|---|---|
| 2003/0093808 A1* | 5/2003 | Eyer | H04N 7/17318 725/111 |
| 2004/0255190 A1* | 12/2004 | Sidhu | H04L 1/22 714/13 |
| 2005/0066372 A1* | 3/2005 | Bertin | H04L 12/1859 725/114 |
| 2006/0248568 A1* | 11/2006 | Hamuz-Cohen | H04N 7/163 725/132 |
| 2009/0279431 A1* | 11/2009 | Baruah | H04L 45/24 370/235 |
| 2012/0149476 A1* | 6/2012 | Perlman | A63F 13/12 463/42 |
| 2015/0120957 A1 | 4/2015 | Yun et al. | |
| 2015/0288995 A1 | 10/2015 | Bae et al. | |
| 2016/0021424 A1* | 1/2016 | Andersson | H04N 21/4383 725/110 |
| 2016/0173945 A1 | 6/2016 | Oh et al. | |
| 2017/0207867 A1* | 7/2017 | Kwon | H04H 20/59 |
| 2018/0146022 A1* | 5/2018 | Kwon | H04L 27/26 |

FOREIGN PATENT DOCUMENTS

| | | |
|---|---|---|
| KR | 10-2013-0065985 A | 6/2013 |
| KR | 10-2015-0056515 A | 5/2015 |
| WO | WO 2015/008986 A1 | 1/2015 |

\* cited by examiner

APPARATUS FOR TRANSMITTING AND RECEIVING DYNAMIC MULTI-MODE SERVICE AND METHOD FOR PROVIDING THE SAME

CROSS REFERENCE TO RELATED APPLICATIONS

This application claims the benefit of Korean Patent Application No. 10-2016-0078220, filed Jun. 22, 2016, and No. 10-2017-0010925, filed Jan. 24, 2017, which are hereby incorporated by reference in their entirety into this application.

BACKGROUND OF THE INVENTION

1. Technical Field

The present invention relates generally to technology for transmitting and receiving a broadcast, and more particularly to technology for providing a dynamic multi-mode service in a hybrid broadcasting environment in which a digital broadcast network and a broadband network are used.

2. Description of the Related Art

Currently, standards for transmission and reception of terrestrial UHDTV broadcast services are based on Advanced Television Systems Committee (ATSC) 3.0, and broadcast networks and broadband networks are used to deliver broadcast services. As a broadband network is available in a terrestrial broadcast service, image and sound data of a broadcast service, delivered through a terrestrial broadcast network, can also be provided through a broadband network, and different broadcast programs, other than a service delivered through a terrestrial network, may be provided through a broadband network through interworking of heterogeneous networks in the terrestrial UHDTV broadcast service.

According to the standards for transmission and reception of terrestrial UHDTV broadcast services, channels of a terrestrial broadcast service include not only physical channels of a terrestrial broadcast network but also channels provided through a broadband network, and different broadcast programs may be provided through all the broadcast service channels that are controllable by a broadcast service company. Here, at least one virtual channel must be present in the physical channels of the terrestrial broadcast network, or multiple virtual channels may be present. Also, no broadcast service may be provided through a broadband network. Particularly, because the number of virtual channels is defined as being variable, a broadcast service company may operate broadband networks as separate virtual channels, and may deliver a portion of broadcast service content through the broadband networks depending on the circumstances. Accordingly, limitations as to the data transmission capacity in the terrestrial broadcast service may be overcome, and a greater variety of service channels may be provided to viewers, compared to the existing broadcasting environment.

A dynamic Multi-Mode Service (dynamic MMS) is a broadcast service operated in such a way that a special service channel is operated along with an existing broadcast channel during a certain time in order to provide an additional broadcast service along with the broadcast service operated as a single channel for the provision of a single service. Such a dynamic MMS and an existing multi-mode service (MMS) have the following differences therebetween.

The existing multi-mode service is configured such that multiple fixed service channels are always operated in specific frequency domains. Accordingly, a reception device always recognizes multiple service channels, unlike the dynamic MMS, in which the presence of service channels depends on a broadcast service. Therefore, in the case of the existing MMS, consistent service signaling and related data transmission are maintained for the multiple service channels from the aspects of the configuration of service signaling and the management of service transmission.

However, in the dynamic MMS, a broadcast channel for transmitting a single service may be changed to multiple broadcast channels for providing various services over time, and when the services of the dynamically generated channels are terminated, only the single service may be transmitted again. Unlike the existing MMS, in which multiple fixed service channels are always operated and content of one channel is not associated with content of another channel, the dynamic MMS enables multiple channels to be operated during a certain time in order to improve the quality of a broadcast service or to expand the range of choice when users select channels, whereby the efficiency of delivery of a broadcast service may be improved and various broadcast scenarios may be provided.

Although the dynamic MMS has the above-mentioned advantages compared to the existing MMS, because a system and operation techniques therefor are inadequate to provide a dynamic MMS in the current broadcast system, only a static multi-mode service is provided by some broadcasting companies in practice. However, in the next-generation broadcast system based on IP-based transmission, freedom in the delivery of broadcast services is increased because both a broadcast network and a broadband network are available, and various reception terminals, such as companion devices and the like, may be used. Accordingly, broadcast technology may be easily extended to provide a new broadcast service, such as a dynamic MMS or the like. However, when a currently viewed channel is switched to a dynamically generated channel during the provision of a dynamic MMS, information about linkage between the channels is required for the configuration of the dynamic MMS.

Meanwhile, Korean Patent Application Publication No. 10-2010-0005877, titled "Data service system and method for providing digital cable broadcasting service and multimedia service through dynamic channel assignment in cable modem that is capable of receiving multi-channel" relates to a data service system and methods for providing a digital cable broadcasting service and a multimedia data service through the assignment of channels in a cable modem, and discloses a data service system and methods for providing a digital cable broadcasting service and a multimedia data service through the assignment of channels, in which some of the channels that are assigned to a cable modem are allocated for the provision of a digital cable broadcasting service or multimedia data service through the communication between a module installed in a subscriber's computer and the cable modem.

However, Korean Patent Application Publication No. 10-2010-0005877 relates to the existing multi-mode service in which linkage information for dynamically switching channels is not used, and has limitations as to the dynamic channel switching.

SUMMARY OF THE INVENTION

An object of the present invention is to expand the range of choice when a viewer selects a service and to provide a variety of additional services by overcoming limitations of an existing single service.

Another object of the present invention is to use a transmission network more effectively than an existing multi-mode service.

A further object of the present invention is to facilitate switching to a channel that is programmed in haste in response to the occurrence of a problem related to the operation of broadcast channels.

Yet another object of the present invention is to dynamically configure various broadcast channels and simultaneously provide broadcast services thereof.

In order to accomplish the above objects, a method for providing a dynamic multi-mode service, in which an apparatus for transmitting a dynamic multi-mode service and an apparatus for receiving a dynamic multi-mode service are used, according to an embodiment of the present invention includes generating, by the apparatus for transmitting a dynamic multi-mode service, signaling information that includes information about linkage between service channels for providing a dynamic multi-mode service based on broadcast schedule information about a broadcast service; transmitting, by the apparatus for transmitting a dynamic multi-mode service, the signaling information and the broadcast service to the apparatus for receiving a dynamic multi-mode service through at least one of a broadcast network and a broadband network; receiving, by the apparatus for receiving a dynamic multi-mode service, the signaling information and the broadcast service in order to provide the dynamic multi-mode service; interpreting, by the apparatus for receiving a dynamic multi-mode service, the information about the linkage between service channels, which is included in the signaling information, by decoding the signaling information; and providing, by the apparatus for receiving a dynamic multi-mode service, the broadcast service by performing dynamic channel switching based on the information about the linkage between service channels.

Here, generating the signaling information may be configured such that the information about the linkage between service channels in a form of an XML element is added to a user service bundle description fragment of the signaling information.

Here, generating the signaling information may be configured to define a linkage type, through which a program that is being provided on an original service channel continues to be provided on a target service channel without interruption, in the information about the linkage between service channels.

Here, generating the signaling information may be configured such that a linkage type between a target service channel and one or more multi-view channels, through which the one or more multi-view channels are made subordinate to the target service channel, is defined in the information about the linkage between service channels in order to provide a multi-view service through the one or more multi-view channels subordinate to the target service channel.

Here, generating the signaling information may be configured such that one or more service-switching points of the broadcast service are set in the information about the linkage between service channels in order to switch the original service channel, which is currently being viewed, to a target service channel and to then provide the broadcast service of the target service channel so as to start from a preset point.

Here, generating the signaling information may be configured to set the one or more service-switching points between a starting point of the broadcast service and a service connection point based on at least one of a program number of the broadcast service and an attribute value specified in meta content.

Here, providing the broadcast service may include providing a first broadcast service of the original service channel based on the broadcast schedule information; providing a second broadcast service by switching the original service channel to a target service channel based on the information about the linkage between service channels; and providing a third broadcast service by switching the target service channel to the original service channel based on the information about the linkage between service channels.

Here, providing the second broadcast service may be configured to switch the original service channel to the target service channel that is providing the second broadcast service, corresponding to the first broadcast service of the original service channel, depending on the linkage type based on the information about the linkage between service channels when termination of the first broadcast service of the original service channel is confirmed based on the broadcast schedule information.

Here, providing the third broadcast service may be configured to switch the target service channel to the original service channel depending on the linkage type based on the information about the linkage between service channels when termination of the second broadcast service of the target service channel is confirmed based on the broadcast schedule information.

Here, providing the third broadcast service may be configured such that, when two or more original service channels, to which the target service channel is capable of being switched, are present, any one channel is selected from among the two or more original service channels based on the information about the linkage between service channels.

Here, providing the second broadcast service may be configured such that, when two or more target service channels, to which the original service channel is to be switched, are present, second broadcast services, corresponding to the two or more target service channels, are provided on a single target service channel.

Here, providing the second broadcast service may be configured such that, when the two or more target service channels, to which the original service channel is to be switched, are present, any one of the target service channels is set as a base channel, multiple broadcast services are selected from among broadcast services of the one or more remaining target service channels, and the selected multiple broadcast services are simultaneously provided as the second broadcast service on the base channel.

Here, providing the second broadcast service may be configured to provide a multi-view service by generating one or more multi-view channels so as to be subordinate to the target service channel based on the information about the linkage between service channels when the second broadcast service of the target service channel provides the multi-view service.

Here, providing the second broadcast service may be configured to switch the one or more multi-view channels to the target service channel by delivering the information about the linkage between service channels to the one or more multi-view channels when the second broadcast service of the target service channel, which provides the multi-view service, is terminated.

Here, providing the second broadcast service may be configured such that the linkage type of the information about the linkage between service channels is set to a service replacement linkage type and is then delivered to the multi-view channels in order to switch the multi-view channels to the target service channel when the second broadcast service of the target service channel, which provides the multi-view service, is terminated.

Here, providing the second broadcast service may be configured such that, when the second broadcast service of the target service channel, which provides the multi-view service, is terminated, the one or more multi-view channels are eliminated based on the information about the linkage between service channels, in which the service replacement linkage type is set, and are automatically switched to the target service channel.

Here, providing the second broadcast service may be configured to check the one or more service-switching points set in the second broadcast service of the target service channel.

Here, providing the second broadcast service may be configured such that, when the one or more service connection points are set in the second broadcast service of the target service channel, the original service channel is switched to the target service channel and the second broadcast service is provided so as to start from any one of the one or more service-switching points.

Also, in order to accomplish the above objects, an apparatus for transmitting a dynamic multi-mode service according to an embodiment of the present invention includes a broadcast schedule generation unit for generating broadcast schedule information about a broadcast service; a signaling information generation unit for generating signaling information that includes information about linkage between service channels for providing a dynamic multi-mode service based on the broadcast schedule information; and a signaling information transmission unit for transmitting the signaling information and the broadcast service through at least one of a broadcast network or a broadband network.

Also, in order to accomplish the above objects, an apparatus for receiving a dynamic multi-mode service according to an embodiment of the present invention includes a media service reception unit for receiving signaling information, in which information about linkage between service channels is included, and a broadcast service in order to provide a dynamic multi-mode service; a linkage information interpretation unit for interpreting the information about the linkage between service channels, included in the signaling information, by decoding the signaling information; and a media service-processing unit for providing a broadcast service by switching channels of the dynamic multi-mode service based on the information about the linkage between service channels.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
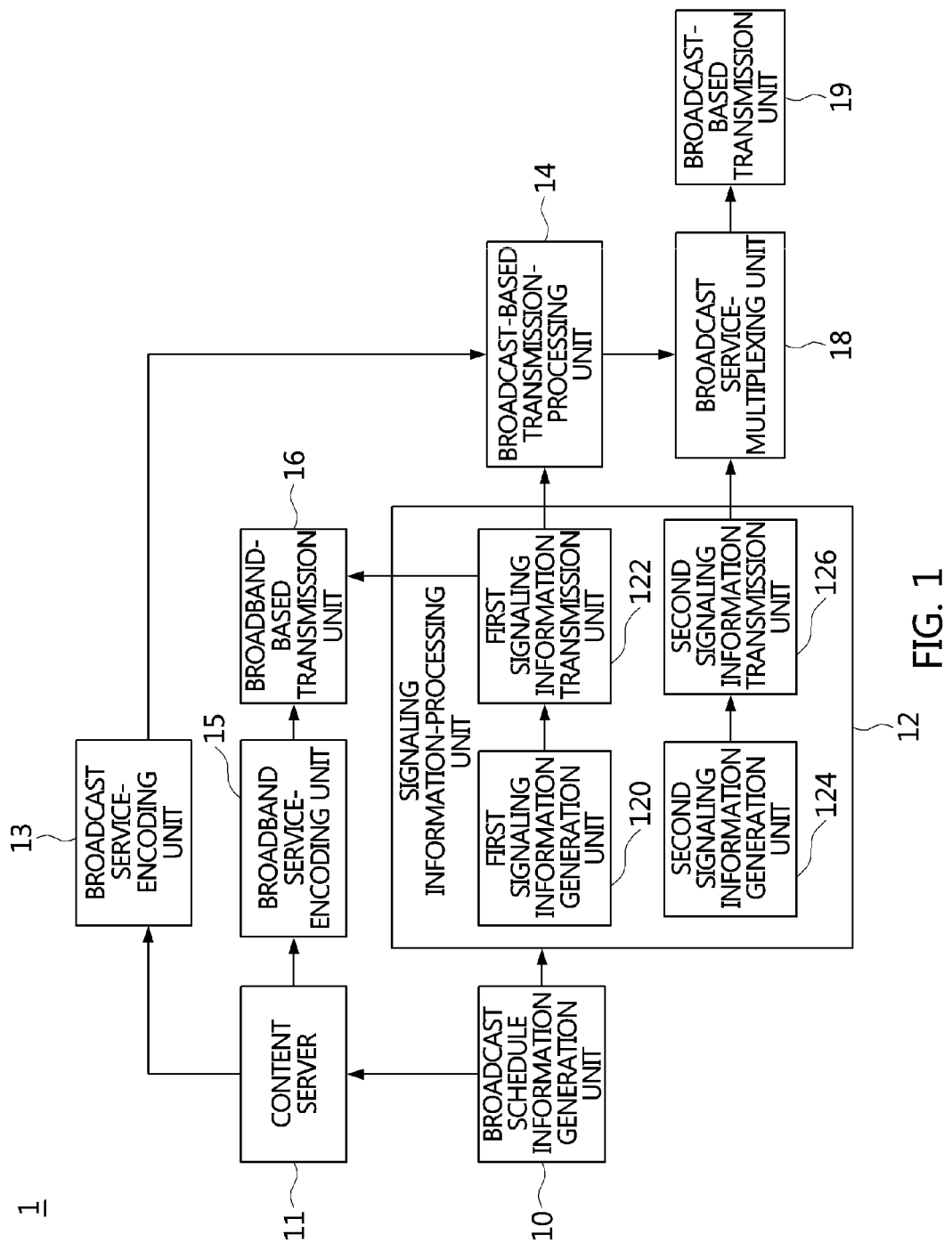
FIG. 1 is a block diagram that shows an apparatus for transmitting a dynamic multi-mode service according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including" specify the presence of stated elements but do not preclude the presence or addition of one or more other elements unless otherwise specified.

The advantages and features of the present invention and methods of achieving them will be apparent from the following exemplary embodiments to be described in more detail with reference to the accompanying drawings. However, it should be noted that the present invention is not limited to the following exemplary embodiments, and may be implemented in various forms. Accordingly, the exemplary embodiments are provided only to disclose the present invention and let those skilled in the art know the category of the present invention, and the present invention is to be defined based only on the claims. The same reference numerals or the same reference designators denote the same elements throughout the specification.

In the following description of the present invention, detailed descriptions of known functions and configurations which are deemed to make the gist of the present invention obscure will be omitted. The terms in this specification are defined in consideration of the functions of the embodiments of the present invention, and may vary according to the intentions of users, operators, and the like or precedents. Therefore, the terms must be defined based on the meanings of the content of the entire specification.

Combinations of blocks or steps in the block diagrams or flowcharts illustrated in the accompanying drawings may be practiced through computer program instructions (execution engines). Because these computer program instructions may be loaded into the processor of a general-purpose computer, a special-purpose computer or a programmable data-processing apparatus, the instructions executed by the processor of the computer or programmable data-processing apparatus create a means for performing the functions specified in each block or step in the block diagrams or flowcharts in the drawings.

In order to implement the functions in a specific manner, these computer program instructions may also be stored in computer-usable or computer-readable memory that may direct a computer or a programmable data-processing apparatus. Accordingly, the instructions stored in the computer-usable or computer-readable memory may produce a manufactured item that includes a means for executing instructions for performing the functions specified in each block or step in the block diagrams or flowcharts in the drawings.

Also, these computer program instructions may be loaded in a computer or a programmable data-processing device. In this case, a process executable by a computer is created by performing a series of operations in the computer or programmable data-processing device, whereby the instructions that operate the computer or the programmable data-processing apparatus may provide steps for performing the functions specified in each block or step in the block diagrams or flowcharts in the drawings.

Also, each block or step in the drawings may indicate a module, a segment, or a part of code that includes one or more executable instructions for performing logical functions specified therein. Also, in some alternative embodiments, the functions specified in blocks or steps may be performed in a different order. For example, two consecutively illustrated blocks or steps may be performed at the same time, or occasionally, they may be performed in the reverse order depending on the corresponding function.

First, in order to help the understanding of the present invention, terms used in a dynamic multi-mode service will be described. The present invention may be based on ATSC 3.0, which is a representative next-generation broadcast technology developed by Advanced Television Systems Committee (ATSC). The ATSC 3.0, which governs new rising standards for a terrestrial UHDTV broadcast service, is suitable for a convergent broadcasting and communication service because signals are transmitted and received based on IP addresses, and enables users to uninterruptedly view a video via a wireless Internet network even in a place at which broadcast signals are weak.

In ATSC 3.0, Low Level Signaling (LLS) and Service Level Signaling (SLS) are used for broadcast service signaling. LLS is IP-level signaling information, and may include information for minimizing service acquisition time before the reception of media for each broadcast service provided through each channel. Here, a Service List Table (SLT), which is a table of information about a broadcast service, a Rating Region Table (RRT), which is rating information for a region in which a broadcast service is provided, a system time, which contains information about time, required for a broadcast system, and the like may be specified in LLS, and information having direct relevance to the acquisition of a broadcast service may correspond to an SLT.

An SLT includes information through which fast service scans and fast service acquisition may be provided, for example, a service identifier (ID), a major channel number of a corresponding service, a minor channel number thereof, the type of service, accessibility to a broadband network, the type of transfer protocols used to transmit SLS of a corresponding service, a Physical Layer Pipe (PLP) ID for identifying a PLP at which SLS delivered via a broadcast network is located, and the like.

Here, information for providing a corresponding service to a user, such as the characteristics of components configuring a service, and the like, is specified in SLS. In the transfer method using Real-Time Object Delivery over Unidirectional Transport (ROUTE)/Dynamic Adaptive Streaming over HTTP (DASH), which is one of transfer methods of ATSC 3.0, a User Service Bundle Description (USBD), a Service-based Transport Session Instance Description (S-TSID) and a Media Presentation Description (MPD) are included in SLS.

The current standards specify signaling information corresponding to the existing multi-mode service, and these are inadequate to provide a dynamic multi-mode service. Accordingly, in order to provide a dynamic multi-mode service in the next-generation broadcast system, the present invention proposes a method for providing a dynamic multi-mode service using an apparatus for transmitting a dynamic multi-mode service and an apparatus for receiving a dynamic multi-mode service.

Hereinafter, a preferred embodiment according to the present invention will be described in detail with reference to the accompanying drawings.

FIG. 1 is a block diagram that shows an apparatus for transmitting a dynamic multi-mode service according to an embodiment of the present invention.

Referring to FIG. 1, an apparatus 1 for transmitting a dynamic multi-mode service according to an embodiment of the present invention, which is capable of generating service signaling information for providing a dynamic multi-mode service based on ATSC 3.0, may include a broadcast schedule information generation unit 10, a content server 11, a signaling information-processing unit 12, a broadcast service-encoding unit 13, a broadband service-encoding unit 15, a broadband-based transmission unit 16, a broadcast service-multiplexing unit 18, and a broadcast-based transmission unit 19.

The apparatus 1 for transmitting a dynamic multi-mode service provides a hybrid broadcasting service using both a broadcast network and a broadband network (a communication network). Particularly, the apparatus 1 provides a dynamic multi-mode service, which dynamically changes the operation of channels in a dynamic multi-mode service section, when the hybrid broadcasting service is provided. Also, the apparatus 1 generates service signaling information for a dynamic multi-mode service and transmits the generated service signaling information in the form of a broadcast signal. Hereinafter, the configuration of the apparatus 1 for transmitting a dynamic multi-mode service will be described in detail.

The broadcast schedule information generation unit 10 may generate broadcast schedule information for a broadcast service.

The content server 11 may manage broadcast services to be delivered via a broadcast network and a broadband network. Here, the content server 11 may deliver broadcast services to the broadcast service-encoding unit 13 and the broadband service-encoding unit 15 depending on the broadcast schedule information received from the broadcast schedule information generation unit 10.

The signaling information-processing unit 12 generates, manages and transmits service signaling information for a dynamic multi-mode service. The signaling information-processing unit 12 may generate the signaling information depending on the broadcast schedule information generated by the broadcast schedule information generation unit 10.

The signaling information-processing unit 12 may include a first signaling information generation unit 120, a first signaling information transmission unit 122, a second signaling information generation unit 124, and a second signaling information transmission unit 126.

Here, the signaling information generation unit in the claims of the present invention may include the first signaling information generation unit 120 and the second signaling information generation unit 124, and the signaling information transmission unit in the claims of the present invention may include the first signaling information transmission unit 122 and the second signaling information transmission unit 126.

The first signaling information generation unit 120 may generate first signaling information through which a service and at least one content component can be found and acquired, and may deliver the generated first signaling information to the first signaling information transmission unit 122. The first signaling information may correspond to SLS data in which a transport session for transmitting at least one content component of a service is specified.

The first signaling information generation unit 120 may generate first signaling information that is suitable for a transfer method depending on the type of protocols used by a broadcast-based transmission-processing unit 14. For example, when the broadcast-based transmission-processing unit 14 uses the ROUTE/DASH method, a USBD, an S-TSID, an MPD, and the like may be generated as SLS data.

The first signaling information may be generated in such a way that information about linkage between service channels (serviceLinkage) is added in the USBD.

TABLE 1

| Element or Attribute Name | use | Description |
|---|---|---|
| serviceLinkage | 0 . . . N | Information about linkage between service channels. There may be multiple pieces of serviceLinkage. |
| @mediaNetworkInformation | 0 . . . 1 | Information about media through which a service is delivered. This may be omitted when the media through which the current service is delivered is the same as the media through which a target service is delivered |
| @bsid | 0 . . . 1 | Information indicative of a bsid in which a target service channel is included if it differs from a bsid in which the currently viewed service channel is included. (When the target service channel and the currently viewed service channel have the same bsid value, this may be omitted.) |
| @LLSGroupId | 0 . . . 1 | Information indicative of an LLSGroupId in which a target service channel is included if it differs from an LLSGroupId in which the currently viewed service channel is included. |
| @serviceId | 1 | Information indicative of the identifier of a target service channel to be connected. |
| @target | 0 . . . 1 | Information about a target service channel |
| @linkageType | 1 | Identifier information for representing an attribute of a link from the currently viewed service channel to a target service channel or the reason for the link. The detailed attribute information will be described in Table 2. |
| @activationTime | 0 . . . 1 | Time information about the time at which the currently viewed channel is switched to a target service channel |
| @deActivationTime | 1 | Time information about the time at which the currently viewed channel is switched to a target service channel |
| @serviceCategory | 0 . . . 1 | Information indicative of a service category of a target service (the broadcast service of a target service channel). For example, a target service may correspond to audio only, linear A/V, linear A/V with app-based enhancement, and the like. |
| @broadbandAccessRequired | 0 . . . 1 | Information indicative of whether access to a broadband network is necessary to present a target service. |
| @svcCapabilities | 0 . . . 1 | Information indicative of capabilities required for decoding in a reception device in order to present a target service |
| linkageData | 0 . . . 1 | Definition of data subordinate to linkageData when additional data for each Linkage Type are necessary |
| . . . | | . . . |

Referring to Table 1, information about linkage between service channels (serviceLinkage) according to an embodiment of the present invention may include service media information (@mediaNetworkInformation), bundle service identifier information (@bsid), LLS group identifier information (@LLSGroupId), service identifier information (@serviceId), target service linkage information (@target), linkage type information (@linkageType), activation time information (@activationTime), deactivation time information (@deActivationTime), service category information (@serviceCategory), broadband network access information (@broadbandAccessRequired), decoding information (@svcCapabilities), and linkage data information (linkageData).

The signaling information is configured so as to include information about linkage between service channels. When a user selects a different channel so the channel is changed, information about linkage between channels, which configure a dynamic multi-mode service, may be required. The information about linkage between service channels may be used when the currently viewed channel is switched to another channel because a user selects the channel or when the channel is switched back to the previously viewed channel because a dynamic multi-mode service section, generated by user selection, is terminated.

Information about linkage between service channels may be used for signaling in which a broadcast service is specified. In order to explain a method for providing information about linkage between service channels in a dynamic multi-mode service, the present invention describes an embodiment in which ROUTE/DASH transfer protocols based on ATSC 3.0 are used. However, the application of the present invention is not limited to the case in which ROUTE/DASH transfer protocols based on ATSC 3.0 are used, and the present invention may also be applied to the case in which MPEG Media Transport (MMT) protocols based on ATSC 3.0, which have conceptual similarity to the ROUTE/DASH protocols, are used, and the configuration of XML-based broadcast and communication signaling meta data.

Information about linkage between service channels in Table 1 may define a descriptor for providing information about linkage between service channels to a reception device when a dynamic multi-mode service is transmitted. For example, an XML element 'serviceLinkage', which includes the elements or attributes shown in Table 1, may be added in the USBD fragment of the currently viewed service channel.

Here, information about linkage between service channels is represented in 'serviceLinkage'. Specifically, @bsid of serviceLinkage indicates a bsid in which a target service channel is included when it is different from the bsid in which the currently viewed service channel is included. When the target service channel and the currently viewed service channel have the same bsid value, @bsid may be omitted. A service identifier (@serviceId) may be the identifier of a target service channel to be linked with the currently viewed service channel. The linkage type (@linkageType) is an identifier for representing the attribute of a link between the currently viewed service channel and a target service channel or the reason for the link, and a value specified in Table 2 may be assigned thereto. The activation time (@activationTime) is information about the time at which the currently viewed service channel must be switched to a target service channel. Here, the time information may be based on Coordinated Universal Time (UTC). When additional data are necessary for each linkage type, linkageData may be used for the corresponding data.

Linkage type information (@linkageType) may enable a program being provided on the currently viewed service channel to continue on a target service channel without interruption.

TABLE 2

| linkageType | Meaning |
| --- | --- |
| '0' | Linkage type information may correspond to a "Program continuity" linkage type. The broadcast service being provided in the currently viewed service channel continues to be provided on a target service channel without interruption, and agreement of a viewer may be required. |
| '1' | Linkage type information may correspond to a "Service Replacement" linkage type. The currently viewed service channel disappears and the channel is unconditionally and automatically switched to a target service channel. |
| other values | Reserved for future use |

Figure 2:
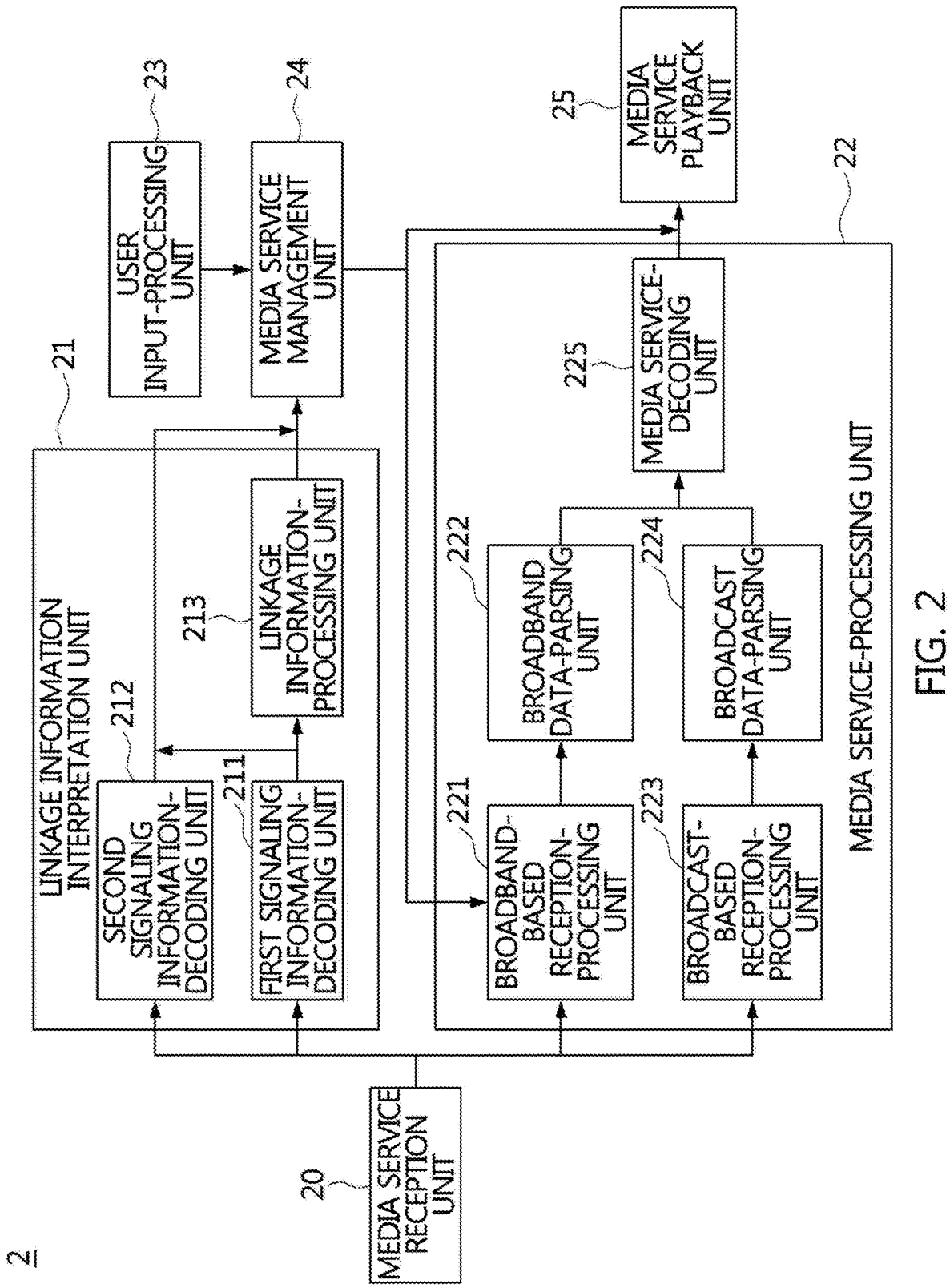
FIG. 2 is a block diagram that shows an apparatus for receiving a dynamic multi-mode service according to an embodiment of the present invention.

Referring to FIG. 2, the linkage type information (@linkageType) may be defined as a 'Program Continuity' linkage type, which requires the agreement of a viewer, or a 'Service Replacement' linkage type, which causes the currently viewed service channel to disappear and the channel to be automatically switched to a target service channel.

The first signaling information transmission unit 122 may transmit the first signaling information generated by the first signaling information generation unit 120 to the broadcast-based transmission-processing unit 14 or the broadband-based transmission unit 16.

The broadcast-based transmission-processing unit 14 may receive the first signaling information from the first signaling information transmission unit 122, and may then transmit the received first signaling information to an apparatus 2 for receiving a dynamic multi-mode service via a broadcast network.

The broadband-based transmission unit 16 may receive the first signaling information from the first signaling information transmission unit 122, and may then transmit the received first signaling information to the apparatus 2 for receiving a dynamic multi-mode service via a broadband network in response to a signaling data request message. The broadband-based transmission unit 16 may be a communication server.

The second signaling information generation unit 124 generates the second signaling information for IP-level signaling, and may deliver the generated second signaling information to the second signaling information transmission unit 126.

The second signaling information transmission unit 126 may transmit the second signaling information generated by the second signaling information generation unit 124 to the broadcast service-multiplexing unit 18.

The second signaling information may correspond to LLS data. LLS data may include an SLT, an RRT, and the like. The broadcast service-multiplexing unit 18 multiplexes a broadcast signal, which includes the second signaling information received from the second signaling information transmission unit 126, and may then transmit the broadcast signal to the apparatus 2 for receiving a dynamic multi-mode service.

Here, the broadcast service-multiplexing unit 18 may multiplex a broadcast signal including the first signaling information and a broadcast signal including the second signaling information.

The broadcast-based transmission unit 19 may transmit the multiplexed broadcast signal, in which signaling information is included, to the apparatus 2 for receiving a dynamic multi-mode service.

FIG. 2 is a block diagram that shows an apparatus for receiving a dynamic multi-mode service according to an embodiment of the present invention.

Referring to FIG. 2, the apparatus 2 for receiving a dynamic multi-mode service according to an embodiment of the present invention may include a media service reception unit 20, a linkage information interpretation unit 21, a media service-processing unit 22, a user input-processing unit 23, a media service management unit 24, and a media service playback unit 25.

The media service reception unit 20 may receive broadcast signals delivered via a broadcast network or a broadband network. The broadcast signal is in the form of a multiplexed media service stream or in the form of a content file.

The media service reception unit 20 separates the broadcast signals into signaling information and broadcast service content data, and may deliver the signaling information and the broadcast service content data to the linkage information interpretation unit 21 and the media service-processing unit 22, respectively.

The linkage information interpretation unit 21 may include a first signaling information-decoding unit 211, a second signaling information-decoding unit 212, and a linkage information-processing unit 213.

Here, the linkage information interpretation unit 21 may deliver SLS data, corresponding to the first signaling information of the signaling information, to the first signaling information-decoding unit 211, and may deliver LLS data, corresponding to the second signaling information, to the second signaling information-decoding unit 212.

The second signaling information-decoding unit 212 may interpret an SLT in the received LLS data, and may deliver the service configuration information to the media service management unit 24.

The linkage information-processing unit 213 analyzes SLS data received from the first signaling information-decoding unit 211, and thereby processes the reception of a service.

Here, the linkage information-processing unit 213 may interpret information about linkage between service channels in the SLS data, which is the first signaling information.

Here, the linkage information-processing unit 213 stores and manages the information about linkage between service channels, acquired from the SLS data, in the form of a list, and may deliver the information about linkage between service channels to the media service management unit 24.

The media service management unit 24 may detect a correlation between services based on the information about linkage between the service channels that are connected with the currently viewed service channel, and may tell a user that the currently viewed service may be provided in different forms.

Here, when it is necessary to change a service depending on the user input received from the user input-processing unit 23, the media service management unit 24 may detect information about the service selected by the user input and information about links between the currently managed service channels.

Here, the media service management unit 24 may manage information about whether a broadcast service can be received and whether the broadcast service can be played.

Here, the media service management unit 24 may deliver information about a service, which needs to be received via a broadband network, to the broadband-based reception-processing unit 221.

Here, the media service management unit 24 may deliver content playback information for playing a broadcast service to the media service playback unit 25 based on information about linkage between service channels.

The media service-processing unit 22 may include a broadband-based reception-processing unit 221, a broadband data-parsing unit 222, a broadcast-based reception-processing unit 223, a broadcast data-parsing unit 224, and a media service-decoding unit 225.

Here, the media service-processing unit 22 may deliver the broadcast content data to different units depending on the media type that is used. That is, the media service-processing unit 22 may deliver data received via a broadband network to the broadband-based reception-processing unit 221, and may deliver data received via a broadcast network to the broadcast-based reception-processing unit 223.

Based on the data received via a broadband network and broadband network service information received from the media service management unit 24, the broadband-based reception-processing unit 221 may classify broadcast service content data depending on the used media and the data type.

The broadband data-parsing unit 222 may parse the broadcast service content data received via a broadband network.

The broadcast data-parsing unit 224 may parse the broadcast service content data received via a broadcast network.

The media service-decoding unit 225 may decode the broadcast service content data, which were parsed after being received via a broadcast network and a broadband network.

The media service playback unit 25 may provide a dynamic multi-mode service by playing the decoded broadcast service content data using the content playback information based on the information about linkage between service channels.

Figure 3:
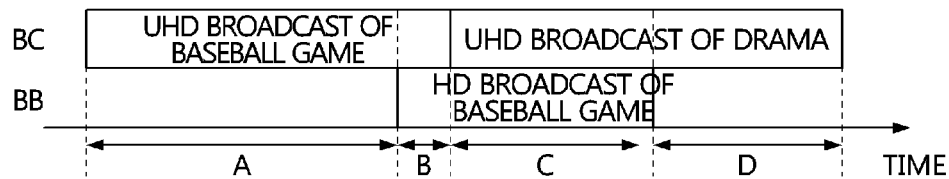
FIG. 3 is a view that shows the concept of a dynamic multi-mode service according to an embodiment of the present invention.

FIG. 3 is a view that shows the concept of a dynamic multi-mode service according to an embodiment of the present invention.

The concept of a dynamic multi-mode service will be described with reference to FIG. 3. For example, assume the case in which, while a baseball game is being broadcast live, a drama has to be broadcast on the same channel due to the channel schedule. In this case, a broadcast service operator may continuously provide the baseball game using the same broadcast network or a broadband network. Here the broadband network may be an IP network.

In a specific broadcast service section as sections B and C in FIG. 3, a broadcast service of a specific channel may be configured as a multi-channel and be transmitted to a reception device. Here, the specific broadcast service section is called a dynamic multi-mode service section. For example, two broadcast channels may be operated in section C, that is, an HD broadcast of the baseball game may be provided on one channel and a UHD broadcast of the drama may be provided on another channel. The additionally configured broadcast service may be assigned a virtual channel number and managed as an independent service, and may be transmitted via a broadcast network or a broadband network.

In sections B and C, which are dynamic multi-mode service sections, a viewer may select a broadcast service. In order to enable a viewer to select a broadcast service, basic information about each service is provided, and an Electronic Service Guide (ESG) or the like may be used therefor. Also, as section D, the dynamic multi-mode service may be terminated due to the sign-off of the service or the change of a service schedule. In this case, when the service finishes, the reception apparatus causes the channel to be automatically switched back to the service channel previously viewed by a viewer, whereby the viewer may be continuously provided with a related broadcast service.

That is, when one or more service channels, other than the existing channels, are additionally provided in the dynamic multi-mode service section in order to provide a dynamic multi-mode service, the additional channels may be operated as follows.

The present invention may operate a new additional channel by dynamically assigning a new channel number thereto in a dynamic multi-mode service section.

That is, the present invention may perform revision of an SLT version, resulting from the addition of the service channel, and may additionally transmit SLS for the new channel. The apparatus 2 for receiving a dynamic multi-mode service may detect that a channel for providing a dynamic multi-mode service is generated through the received SLS.

Also, the present invention may activate a channel, which has a channel number but was operated as a hidden channel before a dynamic multi-mode service section, so that the channel may be operated as a non-hidden channel in the dynamic multi-mode service section.

That is, the present invention may revise the SLT version for the dynamic multi-mode service and transmit signaling data as a result of the change of channel information at the SLS level, and the apparatus 2 for receiving a dynamic multi-mode service may detect that the channel is activated for the dynamic multi-mode service.

The operation of a hidden channel in the present invention does not refer to Service@hidden in an SLT, but may correspond to On/Off operation for the activation of a service.

Figure 4:
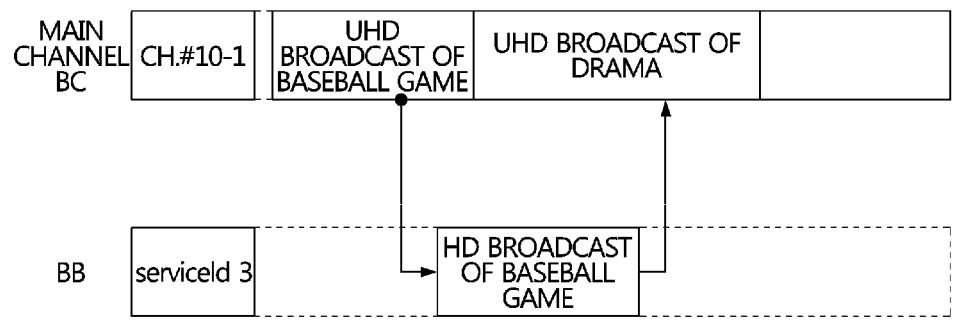
FIG. 4 is a view that shows dynamic channel switching between a main channel and a target channel according to an embodiment of the present invention.

FIG. 4 is a view that shows dynamic channel switching between a main channel and a target channel according to an embodiment of the present invention.

Referring to FIG. 4, a broadcast service transmitted via a broadcast network may be terminated due to a channel schedule. Here, in order to enable a user to continue to view the broadcast service, the currently viewed service channel (main channel) is switched to a dynamically generated target service channel (target channel), whereby the desired broadcast service may continue to be provided to the user. When the broadcast service of the target service channel is terminated, the dynamically generated target service channel disappears, and the user may again view the original main channel.

Accordingly, the user may naturally view the content transmitted through the dynamically generated channel without perceiving a change of channels.

As illustrated in FIG. 4, a dynamic multi-mode service may provide a UHD broadcast of a baseball game on a main channel (CH.#10-1), which is transmitted via a broadcast network (BroadCast, BC).

Here, when the UHD broadcast of the baseball game on the main channel is terminated, the dynamic multi-mode service switches the main channel to a target channel (serviceId 3), which provides an HD broadcast of the baseball game through a broadband network (BroadBand, BB).

Here, when the HD broadcast of the baseball game on the target channel is terminated, the dynamic multi-mode service may switch the target channel back to the main channel.

Here, it is confirmed that the dynamic multi-mode service provides a UHD broadcast of a drama on the main channel.

Figure 5:
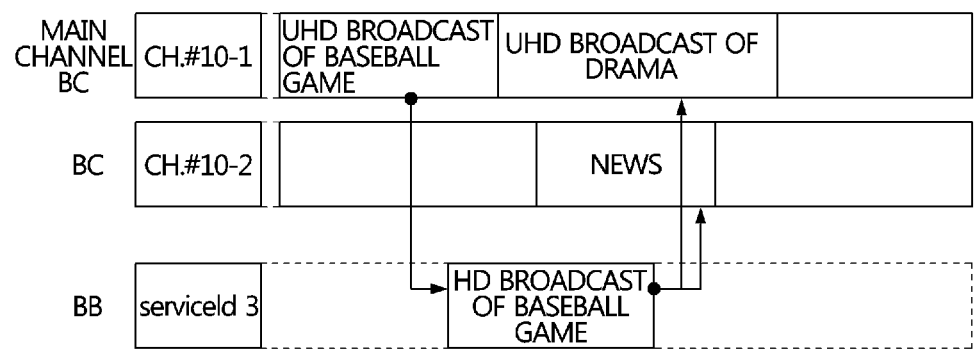
FIG. 5 is a view that shows dynamic channel switching from a target channel to two or more main channels according to an embodiment of the present invention.

FIG. 5 is a view that shows dynamic channel switching from a target channel to two or more main channels according to an embodiment of the present invention.

Referring to FIG. 5, after a main channel is switched to a target channel, when a broadcast service of the target channel is terminated, there are two or more main channels to which the target channel can be switched.

Here, for a single broadcast service, two or more pieces of service linkage information may be specified, and a user may select a service when two or more pieces of channel linkage information are provided. In order to provide such a service, the media service management unit 24, which has been described with reference to FIG. 2, may manage content playback information, information about linkage between service channels, information about a selection made by a user, and the like, and may perform dynamic channel switching.

As illustrated in FIG. 5, a dynamic multi-mode service may provide a UHD broadcast of a baseball game on a main channel (CH.#10-1).

Here, when the UHD broadcast of the baseball game on the main channel is terminated, the dynamic multi-mode service switches the main channel to a target channel (serviceId 3), which provides an HD broadcast of the baseball game through a broadband network (BroadBand, BB).

Here, when the HD broadcast of the baseball game on the target channel is terminated, the dynamic multi-mode service may switch the target channel back to the previous main channel.

Here, it is confirmed that there are two main channels to which the target channel can be switched, and that the first main channel (CH.#10-1) delivers a UHD broadcast of a drama and the second main channel (CH.#10-2) delivers a news.

Here, the dynamic multi-mode service may select a main channel by requesting a user to select the main channel to which the target channel is to be switched, or may perform dynamic channel switching by automatically selecting a main channel based on information about selection by a user, content playback information, and information about linkage between service channels.

Here, it is confirmed that the dynamic multi-mode service provides a UHD broadcast of a drama on the main channel, which is switched to from the target channel.

Figure 6:
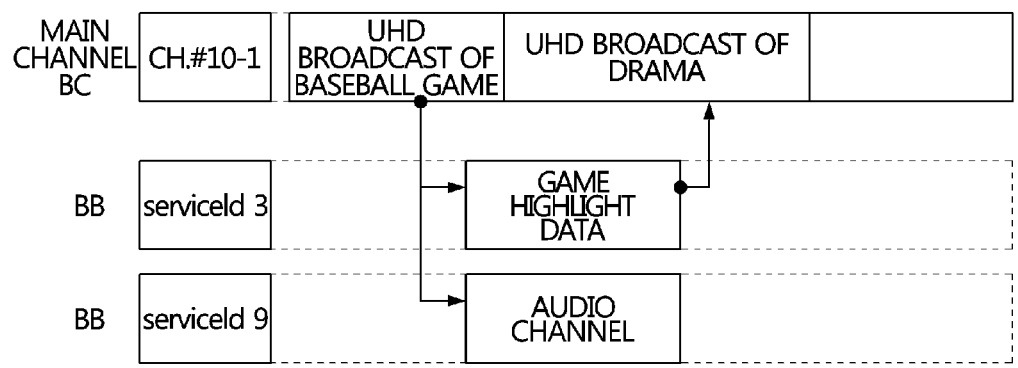
FIG. 6 is a view that shows dynamic channel switching from a main channel to two or more target channels according to an embodiment of the present invention.

FIG. 6 is a view that shows dynamic channel switching from a main channel to two or more target channels according to an embodiment of the present invention.

Referring to FIG. 6, if a service can be connected from a single main channel to multiple target channels, multiple broadcast services of the target channels may be selected and may be simultaneously provided.

For example, the dynamic multi-mode service may provide rich media content using an app channel through a second broadband network while providing a music program through a first broadband network.

As illustrated in FIG. 6, the dynamic multi-mode service may provide a UHD broadcast of a baseball game on a main channel (CH.#10-1) through a broadcast network (BroadCast, BC).

Here, when the UHD broadcast of the baseball game on the main channel is terminated, the dynamic multi-mode service performs dynamic channel switching by switching the main channel to a first target channel (serviceId 3), which provides game highlight data through a first broadband network (BroadBand, BB), and to a second target channel (audio channel), which provides a music program through a second broadband network (BB).

Here, when the broadcast service for the game highlight data on the first target channel is terminated, the dynamic multi-mode service may also terminate the music program on the second target channel, and may then switch the first and second target channels back to the previous main channel.

Here, it is confirmed that the dynamic multi-mode service provides a UHD broadcast of a drama on the main channel.

Figure 7:
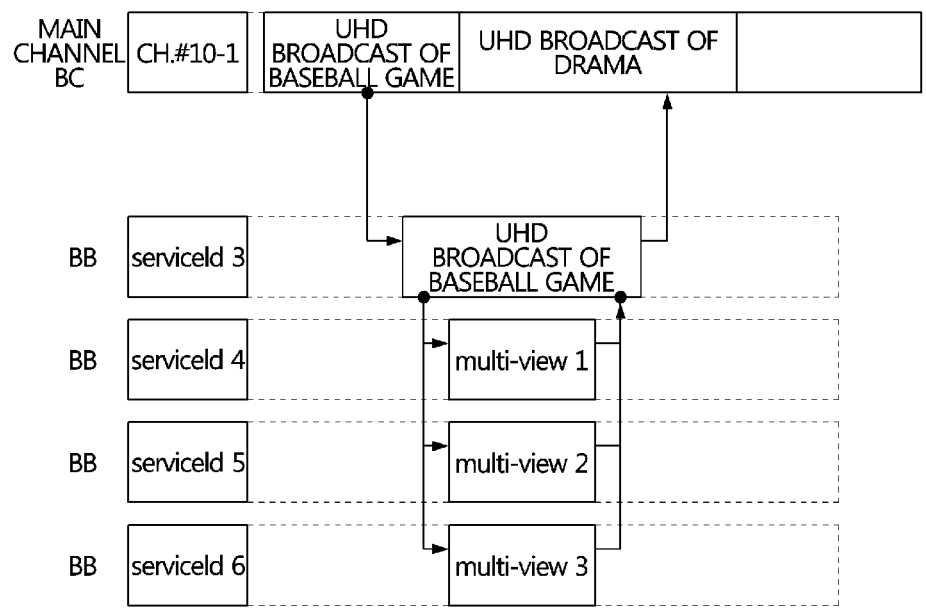
FIG. 7 is a view that shows dynamic channel switching of a target channel that provides a multi-view service according to an embodiment of the present invention.

FIG. 7 is a view that shows dynamic channel switching to a target channel that provides a multi-view service according to an embodiment of the present invention.

Referring to FIG. 7, if a dynamically generated channel is a channel on which a multi-view service may be configured, the channel providing the multi-view service is configured as a target channel, whereby a multi-view service may be provided to a user.

As illustrated in FIG. 7, a dynamic multi-mode service may provide a UHD broadcast of a baseball game on a main channel (CH.#10-1) through a broadcast network (Broad-Cast, BC).

Here, when the UHD broadcast of the baseball game on the main channel is terminated, the dynamic multi-mode service switches the main channel to a target channel (serviceId 3), which provides an HD broadcast of the baseball game through a broadband network (BroadBand, BB).

Here, after it starts to provide the HD broadcast of the baseball game through a broadband network, the dynamic multi-mode service transmits the broadcast signals, delivered from the cameras that film the baseball game, to respective multi-view channels (serviceId 4, serviceId 5, and serviceId 6) from a specific time point, whereby channels may be dynamically generated.

Here, through the multi-view channels, the dynamic multi-mode service may provide multi-view services (multi-view 1, multi-view 2, and multi-view 3) based on the broadcast signals delivered from the cameras filming the baseball game.

[Embodiment 1]

```
<xml version"1.0" encoding="utf-8"?>
<bundleDescrtiption
xmlns="urn:3GPP:metadata2005:MBMS:userServiceDescription"
xmlns:r12="urn:3GPP:metadata:2013:MBMS:userServiceDescription"
xmlns:atsc="urn:atsc:meta:data:2015:atsc3.0:userServicedescription">
<userServiceDescription globalServiceID="urn:atsc:service:d:6_2_bb"
serviceId="2001" fullMPDUri="mpd.xml">
<deliveryMethod>
<unicastAppservice>
<basePattern>live3</basePattern>
<basePattern>live4</basePattern>
</unicastAppservice>
<privateExt>
<serviceLinkage serviceId="3001" linkageType=?0"activationTime=
"2016-05-25T18:06:55Z"/>
<serviceLinkage serviceId="4001" linkageType=?0"activationTime=
"2016-05-25T18:06:55Z"/>
<serviceLinkage serviceId="5001" linkageType=?0"activationTime=
"2016-05-25T18:06:55Z"/>
<serviceLinkage serviceId="6001" linkageType=?0"activationTime=
"2016-05-25T18:06:55Z"/>
<privateExt>
</userServiceDescription>
</bundleDescrtiption>
```

Referring to Embodiment 1, in order to use multi-view content related to serviceId 2001, information about links between service channels, corresponding to serviceId 3001, 4001, 5001, and 6001, is provided.

Also, the multi-view channels may be subordinate to the target channel (serviceId 3) over which the HD broadcast of the baseball game is provided. Accordingly, when the HD broadcast of the baseball game is terminated, the dynamic multi-mode service delivers the information about the linkage between service channels to the multi-view channels, and may thereby switch the multi-view channels to the target channel (serviceId 3), which is the parent channel thereof.

[Embodiment 2]

```
<?xml version"1.0" encoding="utf-8"?>
<bundleDescrtiption
xmlns="urn:3GPP:metadata2005:MBMS:userServiceDescription"
xmlns:r12="urn:3GPP:metadata:2013:MBMS:userServiceDescription"
xmlns:atsc="urn:atsc:meta:data:2015:atsc3.0:userServicedescription">
<userServiceDescription globalServiceID="urn:atsc:serviced:6_2_bb"
serviceId="3001" fullMPDUri="mpd.xml">
<deliveryMethod>
<unicastAppservice>
<basePattern>live3</basePattern>
<basePattern>live4</basePattern>
</unicastAppservice>
<privateExt>
<serviceLinkage serviceId="2001" linkageType="1"
activationTime="2016-05-25T20:06:55Z" deActivationTime="2016-
05-25T20:07:09Z"serviceCategory="1"/>
</privateExt>
</userServiceDescription>
</bundleDescrtiption>
```

Referring to Embodiment 2, in order to perform dynamic channel switching to the parent channel 2001 when viewing of the multi-view channels is terminated, linkageType is set to 1 (service replacement), and then the information about the linkage between service channels (serviceLinkage) is delivered to the respective multi-view channels.

Here, when the HD broadcast of the baseball game on the target channel is terminated, the dynamic multi-mode service may switch the target channel back to the main channel.

Here, it is confirmed that the dynamic multi-mode service provides a UHD broadcast of a drama on the main channel.

Figure 8:
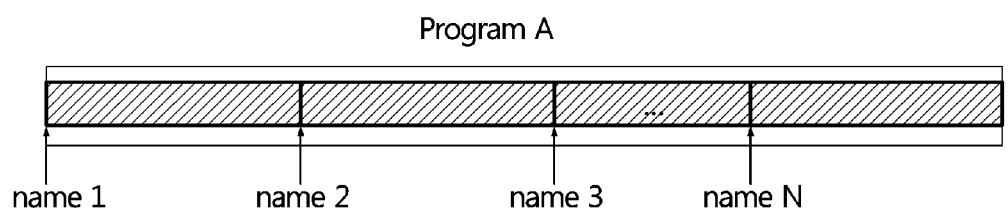
FIG. 8 is a view that shows a service-switching point set for a broadcast service, which is included in information about linkage between service channels, according to an embodiment of the present invention.

FIG. 8 is a view that shows a service-switching point set for a broadcast service in the information about linkage between service channels according to an embodiment of the present invention.

Referring to FIG. 8, the service-switching point set for a broadcast service in the information about linkage between service channels according to an embodiment of the present invention may be defined in the target service linkage information (@target) in Table 2.

The target service linkage information (@target) may be specifically defined as shown in Table 3 when a hierarchical relationship or a link is present between channels.

TABLE 3

| Possible Values | Meaning |
|---|---|
| currentServiceList | Attribute information indicating that a channel can be moved to one of the channels in the list specified in the currently provided SLT. A user may switch a channel by selecting a channel. |
| Root | Attribute information indicative of switching a channel to a main channel. A channel having the lowest minor number, among channels having the same major channel number, or a channel having a specific channel number set by a broadcasting company may become the main channel. |
| Parent | Attribute information indicative of switching a channel to a parent channel. |
| Parent Sibling | Attribute information indicative of switching a channel to a service channel at the same level at which the parent channel is located. |
| Singling | Attribute information indicative of the change to the service channel at the same level at which the currently viewed service channel is located. |
| #name | Attribute information that includes a name value that is acquirable through different information such as meta data. This value enables a shift to a specific point in the currently viewed service. For example, this value may be represented using the format 'Service_id.Program.name'. Also, the name attribute may be a specific point or a specific section of a program (name attribute may be represented as a time value or specific meta data). |
| URI | A URI value or UUID information indicative of a target service or a specific resource that configures the target service. This may be a service URI for receiving a service through a broadband network, or a URI through which an app related to a broadcast service can be executed. |

Figure 9:
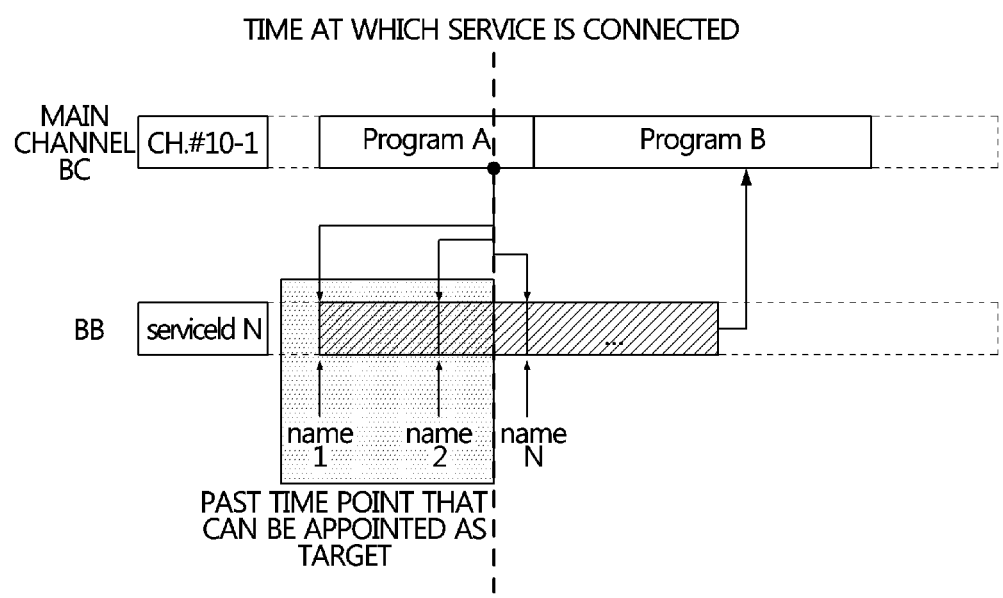
FIG. 9 is a view that shows dynamic channel switching between a main channel and a target channel based on a service-switching point according to an embodiment of the present invention.

FIG. 9 is a view that shows dynamic channel switching between a main channel and a target channel based on a service-switching point according to an embodiment of the present invention.

Referring to FIG. 9, the dynamic multi-mode service may perform channel switching using the target service linkage information (target=@name) specified in Table 3.

To this end, if a channel can be switched using a service-switching point set in a broadcast service in the dynamic multi-mode service, a user may select a specific point in the broadcast service and view the broadcast service from the selected point.

As illustrated in FIG. 9, when a channel is switched while a user is viewing Program A, the dynamic multi-mode service may set not only name N but also name 1 or name 2, corresponding to a past point in the content, as a service-switching point, and may then provide a broadcast service.

Here, using the name attribute, the dynamic multi-mode service may provide the broadcast service that is currently being provided, and may also provide a broadcast service from a certain past point based on a preset service-switching point.

Hereinafter, a method for providing a dynamic multi-mode service according to an embodiment of the present invention will be broken down into a method for transmitting a dynamic multi-mode service and a method for receiving a dynamic multi-mode service, and the respective methods will be described.

Figure 10:
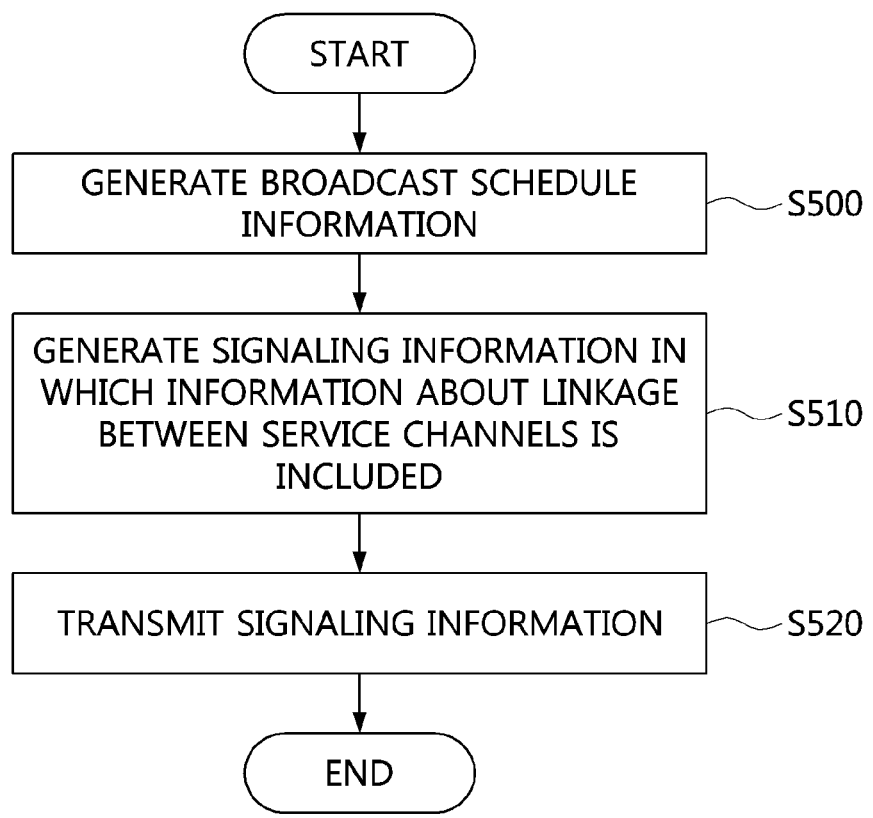
FIG. 10 is a flowchart that shows a method for transmitting a dynamic multi-mode service according to an embodiment of the present invention.

FIG. 10 is a flowchart that shows a method for transmitting a dynamic multi-mode service according to an embodiment of the present invention.

Referring to FIG. 10, in the method for transmitting a dynamic multi-mode service according to an embodiment of the present invention, first, broadcast schedule information may be generated at step S500.

That is, broadcast schedule information for a broadcast service may be generated at step S500.

Here, step S500 may be performed by the broadcast schedule information generation unit 10, the content server 11, the broadcast service-encoding unit 13 and the broadband service-encoding unit 15 of the apparatus 1 for transmitting a dynamic multi-mode service.

Also, in the method for transmitting a dynamic multi-mode service according to an embodiment of the present invention, signaling information that includes information about linkage between service channels may be generated at step S510.

That is, signaling information, in which the information about linkage between service channels for providing a dynamic multi-mode service is included, is generated at step S510 based on the broadcast schedule information for the broadcast service.

Here, at step S510, the information about linkage between service channels in the form of an XML element may be added in a user service bundle description fragment.

Here, at step S510, when a new channel number is dynamically assigned in a dynamic multi-mode service section, signaling information for the new channel may be additionally generated. In another example, at step S510, if a channel, which has a channel number but was deactivated before the dynamic multi-mode service section, is activated in the dynamic multi-mode service section, signaling information for the activated channel may be changed.

Here, at step S510, a linkage type for enabling a program provided on the currently viewed service channel to be continuously provided on a target service channel may be defined in the information about linkage between service channels.

Here, at step S510, linkage type information defined as a program continuity linkage type, which enables the program provided on the currently viewed service channel to continue on the target service channel without interruption, may be configured in the information about linkage between service channels. In another example, at step S510, linkage type information defined as a service replacement linkage type, which causes the currently viewed channel to disappear and then be automatically switched to the target service channel, may be configured in the information about linkage between service channels.

Here, at step S510, in order to provide a multi-view service using one or more multi-view channels subordinate to the target service channel, a linkage type for connecting the target service channel with the one or more multi-view channels such that the multi-view channels are subordinate to the target channel may be defined in the information about linkage between service channels.

Here, at step S510, when the currently viewed service channel is switched to a target service channel, activation time information that represents the time at which the currently viewed service channel must be switched to the target service channel may be configured in the information about linkage between service channels.

Here, at step S510, when the currently viewed service channel is switched to a target service channel, deactivation time information that represents the time at which the currently viewed service channel must be switched to the target service channel may be configured in the information about the linkage between service channels.

Here, at step S510, in order to switch the currently viewed service channel to a target service channel and to make a broadcast service provided on the target service channel start from a predefined point, one or more service-switching points may be set in the broadcast service and be included in the information about linkage between service channels.

Here, at step S510, the one or more service-switching points may be set between the start point of the broadcast service and a service connection point based on at least one of the program number of the broadcast service and an attribute value specified in meta content.

Here, step S510 may be performed by the signaling information-processing unit 12 of the apparatus 1 for transmitting a dynamic multi-mode service.

Also, in the method for transmitting a dynamic multi-mode service according to an embodiment of the present invention, signaling information may be transmitted at step S520.

That is, at step S520, the signaling information and the broadcast service may be transmitted to an apparatus 2 for receiving a dynamic multi-mode service through at least one of a broadcast network and a broadband network.

Here, at step S520, the signaling information and the broadcast service may be transmitted via a broadcast network, a broadband network, or a hybrid network that represents a convergence of the broadcast network and the broadband network.

Here, step S520 may be performed by the first signaling information transmission unit 122, the second signaling information transmission unit 126, the broadcast service-encoding unit 13, the broadband service-encoding unit 15, the broadband-based transmission unit 16, the broadcast-based transmission-processing unit 14, the broadcast service-multiplexing unit 18, and the broadcast-based transmission unit 19 of the apparatus 1 for transmitting a dynamic multi-mode service.

Figure 11:
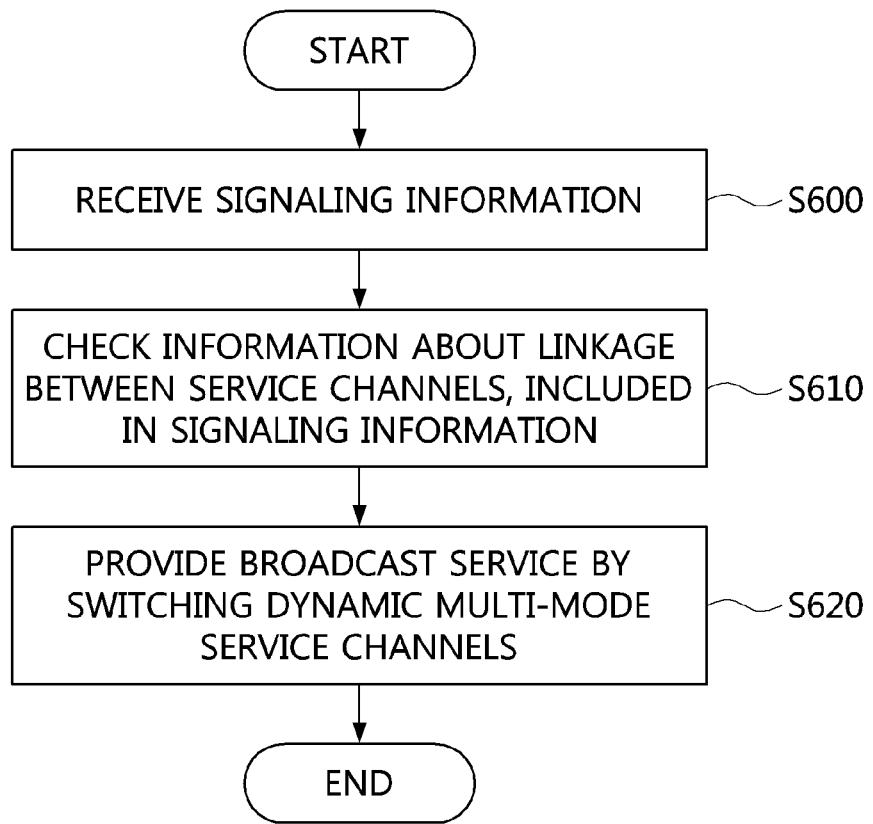
FIG. 11 is a flowchart that shows a method for receiving a dynamic multi-mode service according to an embodiment of the present invention.

FIG. 11 is a flowchart that shows a method for receiving a dynamic multi-mode service according to an embodiment of the present invention.

Referring to FIG. 11, in the method for receiving a dynamic multi-mode service according to an embodiment of the present invention, signaling information may be received at step S600.

That is, at step S600, signaling information, which includes information about linkage between service channels, and a broadcast service may be received in order to provide a dynamic multi-mode service.

Here, at step S600, the signaling information and the broadcast service may be received via a broadcast network, a broadband network, or a hybrid network that represents a convergence of the broadcast network and the broadband network.

Here, step S600 may be performed by the media service reception unit 20 of the apparatus 2 for receiving a dynamic multi-mode service.

Also, in the method for receiving a dynamic multi-mode service according to an embodiment of the present invention, information about linkage between service channels, included in the signaling information, may be checked at step S610.

That is, at step S610, the information about linkage between service channels, included in the signaling information, may be interpreted by decoding the signaling information.

Here, at step S610, the received signaling information is decoded, whereby the information about linkage between service channels included therein may be checked.

Here, at step S610, as a result of checking the information about linkage between service channels, attribute information of the currently viewed service channel and a target service channel, content playback information, information about a selection made by a user, information about whether dynamic channel switching is possible, and the like may be checked.

Here, step S610 may be performed by the linkage information interpretation unit 21 of the apparatus 2 for receiving a dynamic multi-mode service.

Also, in the method for receiving a dynamic multi-mode service according to an embodiment of the present invention, a broadcast service may be provided by performing dynamic channel switching at step S620.

That is, at step S620, a first broadcast service of the currently viewed service channel may be provided based on broadcast schedule information.

Here, at step S620, if the linkage type of information about linkage between service channels is a program continuity linkage type, a viewer is prompted to agree with switching of a program, and when the viewer agrees with switching of the program, the currently viewed service channel may be switched to a target service channel.

Here, the range of choice may be expanded when a dynamic multi-mode service is provided. In order to enable a viewer to select a service, it is necessary to provide basic information about each service, and an Electronic Service Guide (ESG) and the like may be used therefor.

In another example, at step S620, if the detected linkage type of the information about linkage between service channels is a service replacement linkage type, the currently viewed service channel is eliminated and the channel is automatically switched to a target service channel at the time at which the currently viewed service channel must be switched to the target service channel.

Here, at step S620, first, an original service channel, which is currently being viewed, may be switched to a target service channel at step S621.

Also, at step S620, whether there are two or more target service channels may be checked at step S622 in order to perform channel switching.

That is, whether there are two or more target service channels may be checked at step S622 based on information about linkage between service channels.

Here, when it is determined at step S622 that there are two or more target service channels, broadcast services of the two or more target service channels may be simultaneously provided at step S623.

Here, when there are two or more target service channels to which the original service channel is to be switched, second broadcast services, corresponding to the two or more target service channels, may be provided on a single target service channel at step S623.

Here, at step S623, any one target service channel is set as a base channel, and multiple broadcast services of the one or more remaining target service channels are selected, whereby the selected multiple broadcast services may be simultaneously provided as second broadcast services on the base channel.

Also, when it is determined at step S622 that there is only one target service channel, whether the target service channel provides a multi-view service may be checked at step S624.

Here, when it is determined at step S624 that the target service channel provides a multi-view service, the multi-view service may be provided at step S625.

Here, if the second broadcast service of the target service channel provides a multi-view service, one or more multi-view channels are generated so as to be subordinate to the target service channel based on information about linkage between service channels, whereby the multi-view service may be provided at step S625.

Also, when it is determined at step S624 that the target service channel does not provide a multi-view service, a service connection point of the target service channel may be checked at step S626.

That is, one or more service-switching points set in the second broadcast service of the target service channel may be checked at step S626.

Also, at step S620, the broadcast service of the target service channel may be provided at step S627.

That is, at step S627, when the sign-off of the first broadcast service of the original service channel is confirmed based on broadcast schedule information, the channel may be switched to the target service channel that is providing the second broadcast service, which corresponds to the first broadcast service of the original service channel, based on the linkage type of the information about linkage between service channels.

Here, the second broadcast service of the target service channel may be provided at step S627.

Here, if the second broadcast service of the target service channel provides a multi-view service, the multi-view service may be provided at step S627 through multi-view channels that are subordinate to the target service channel.

Also, at step S627, if one or more service connection points are set in the second broadcast service of the target service channel, the original service channel is switched to the target service channel, and the second broadcast service may be provided such that it starts from any one point of the one or more service-switching points.

Also, at step S620, the target service channel may be switched to the original service channel at step S628.

That is, when the sign-off of the second broadcast service of the target service channel is confirmed based on broadcast schedule information, the target service channel may be switched to the original service channel at step S628 depending on the linkage type of the information about linkage between service channels.

Here, at step S628, if the second broadcast services of the target service channel that provides the multi-view service are terminated, one or more multi-view channels may be switched to the target service channel by delivering information about linkage between service channels to the one or more multi-view channels.

Here, at step S628, in order to switch the multi-view channels to the target service channel, the linkage type, among the information about linkage between service channels, may be set to a service replacement linkage type, and then the information may be delivered to the multi-view channels.

Here, at step S628, the one or more multi-view channels are eliminated based on the information about linkage between service channels, in which the linkage type is set to a service replacement linkage type, and the channel may be automatically switched to the target service channel.

Also, at step S628, first, it is checked at step S628A whether there are two or more channels to which the target channel can be switched back.

That is, when it is determined at step S628A that there are two or more original service channels to which the target channel can be switched back, any one original service channel may be selected at step S628B.

Here, when there are two or more original service channels to which the target service channel can be switched, any one channel may be selected from among the two or more original service channels at step S628B based on information about linkage between service channels.

Here, a third broadcast service of the original service channel, which is selected at step S628b, may be provided at step S628C.

Also, when it is determined at step S628A that there is only one original service channel to which the target service channel can be switched back, the third broadcast service of the original service channel may be provided at step S628C.

That is, the third broadcast service of the original service channel may be provided at step S628C based on information about linkage between service channels.

Here, step S620 may be performed by the media service-processing unit 22, the user input-processing unit 23, the media service management unit 24, and the media service playback unit 25 of the apparatus 2 for receiving a dynamic multi-mode service.

That is, at step 620, when the service is terminated, viewers are naturally prompted to switch the channel back to the previous service channel, whereby a related broadcast service may be continuously provided.

Figure 12:
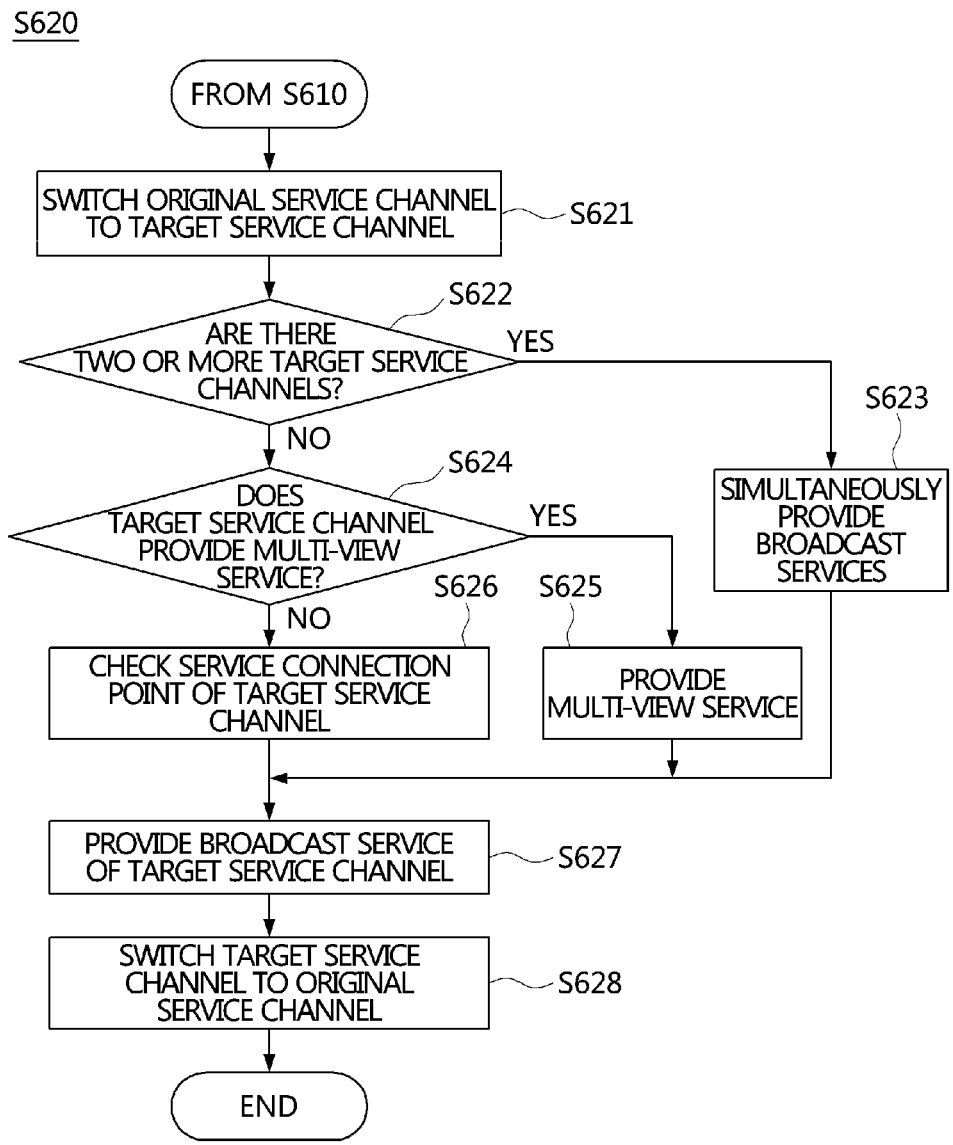
FIG. 12 is a flowchart that specifically shows an example of the step of providing a broadcast service, illustrated in FIG. 11.

FIG. 12 is a flowchart that specifically shows an example of the step of providing a broadcast service illustrated in FIG. 11.

Referring to FIG. 12, at step S620, first, an original service channel, which is currently being viewed, may be switched to a target service channel at step S621.

Also, at step S620, whether there are two or more target service channels may be checked at step S622 in order to perform channel switching.

That is, whether there are two or more target service channels may be checked at step S622 based on information about linkage between service channels.

Here, when it is determined at step S622 that there are two or more target service channels, broadcast services of the two or more target service channels may be simultaneously provided at step S623.

Here, when there are two or more target service channels to be switched to from the original service channel, second broadcast services, corresponding to the two or more target service channels, may be provided on a single target service channel at step S623.

Here, at step S623, any one target service channel is set as a base channel, and multiple broadcast services of the one or more remaining target service channels are selected, whereby the selected multiple broadcast services may be simultaneously provided as second broadcast services on the base channel.

Also, when it is determined at step S622 that there is only one target service channel, whether the target service channel provides a multi-view service may be checked at step S624.

Here, when it is determined at step S624 that the target service channel provides a multi-view service, the multi-view service may be provided at step S625.

Here, if the second broadcast service of the target service channel provides a multi-view service, one or more multi-view channels are generated so as to be subordinate to the target service channel based on information about linkage between service channels, whereby the multi-view service may be provided at step S625.

Also, when it is determined at step S624 that the target service channel does not provide a multi-view service, a service connection point of the target service channel may be checked at step S626.

That is, one or more service-switching points set in the second broadcast service of the target service channel may be checked at step S626.

Also, at step S620, the broadcast service of the target service channel may be provided at step S627.

That is, at step S627, when the sign-off of the first broadcast service of the original service channel is confirmed based on broadcast schedule information, the channel may be switched to the target service channel that is providing the second broadcast service, which corresponds to the first broadcast service of the original service channel, based on the linkage type of the information about linkage between service channels.

Here, the second broadcast service of the target service channel may be provided at step S627.

Here, if the second broadcast service of the target service channel provides a multi-view service, the multi-view service may be provided at step S627 through multi-view channels that are subordinate to the target service channel.

Also, at step S627, if one or more service connection points are set in the second broadcast service of the target service channel, the original service channel is switched to the target service channel, and the second broadcast service may be provided such that it starts from any one point of the one or more service-switching points.

Also, at step S620, the target service channel may be switched to the original service channel at step S628.

That is, when the sign-off of the second broadcast service of the target service channel is confirmed based on broadcast schedule information, the target service channel may be switched to the original service channel at step S628 depending on the linkage type of the information about linkage between service channels.

Here, at step S628, if the second broadcast services of the target service channel that provides the multi-view service are terminated, one or more multi-view channels may be switched to the target service channel by delivering information about linkage between service channels to the one or more multi-view channels.

Here, at step S628, in order to switch the multi-view channels to the target service channel, the linkage type, among the information about linkage between service channels, may be set to a service replacement linkage type, and then the information may be delivered to the multi-view channels.

Here, at step S628, the one or more multi-view channels are eliminated based on the information about linkage between service channels, in which the linkage type is set to a service replacement linkage type, and the channel may be automatically switched to the target service channel.

Also, at step S628, first, it is checked at step S628A whether there are two or more channels to which the target channel can be switched back.

That is, when it is determined at step S628A that there are two or more original service channels to which the target channel can be switched back, any one original service channel may be selected at step S628B.

Here, when there are two or more original service channels to which the target service channel can be switched, any one channel may be selected from among the two or more original service channels at step S628B based on information about linkage between service channels.

Here, a third broadcast service of the original service channel, which is selected at step S628B, may be provided at step S628C.

Also, when it is determined at step S628A that there is only one original service channel to which the target service channel can be switched back, the third broadcast service of the original service channel may be provided at step S628C.

That is, the third broadcast service of the original service channel may be provided at step S628C based on information about linkage between service channels.

Figure 13:
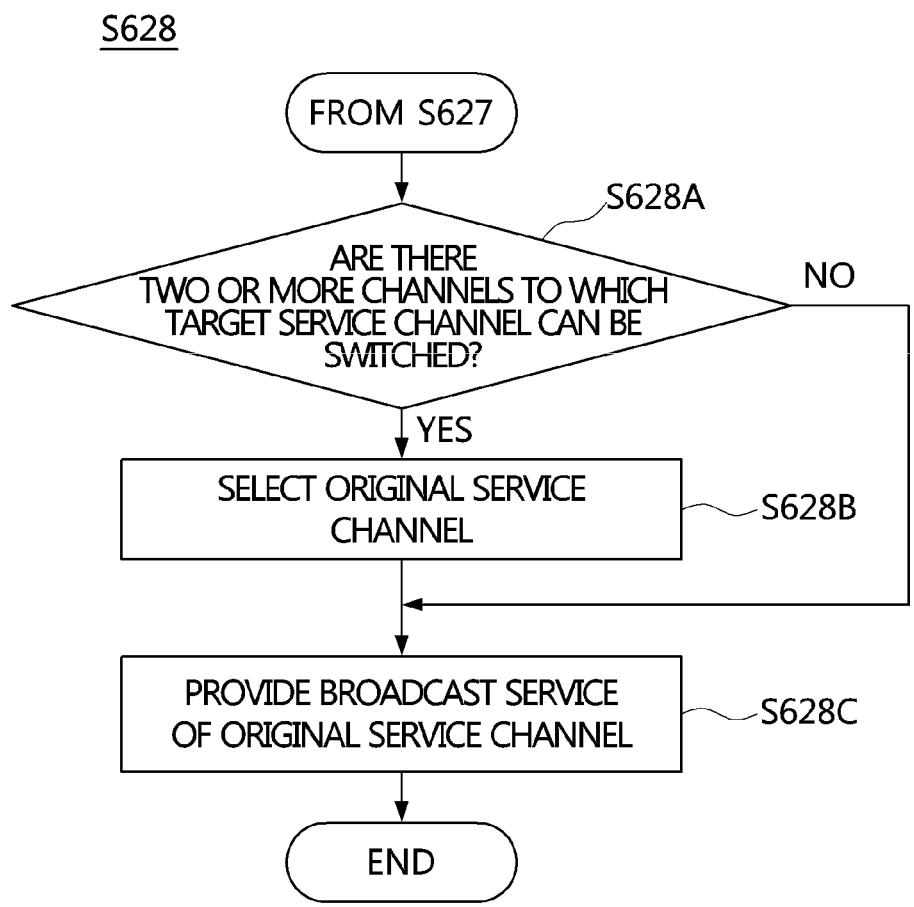
FIG. 13 is a flowchart that specifically shows an example of the step of switching a target service channel to an original service channel, illustrated in FIG. 12.

FIG. 13 is a flowchart that specifically shows an example of the step of switching a target service channel to an original service channel, illustrated in FIG. 12.

Referring to FIG. 13, at step S628, first, it is checked at step S628A whether there are two or more channels to which the target channel can be switched back.

That is, when it is determined at step S628A that there are two or more original service channels to which the target channel can be switched back, any one original service channel may be selected at step S628B.

Here, when there are two or more original service channels to which the target service channel can be switched, any one channel may be selected from among the two or more original service channels at step S628B based on information about linkage between service channels.

Here, a third broadcast service of the original service channel, which is selected at step S628B, may be provided at step S628C.

Also, when it is determined at step S628A that there is only one original service channel to which the target service channel can be switched back, the third broadcast service of the original service channel may be provided at step S628C.

That is, the third broadcast service of the original service channel may be provided at step S628C based on information about linkage between service channels.

The present invention may overcome the limitations of the existing single service, whereby a variety of additional services may be provided and the range of choice may be expanded when a viewer selects a service.

Also, the present invention may enable a transmission network to be used more effectively than the existing multi-mode service.

Also, the present invention may facilitate switching to a channel that is programmed in haste in response to the occurrence of a problem related to the operation of broadcast channels.

Also, the present invention may dynamically configure various broadcast channels and simultaneously provide broadcast services thereof.

As described above, the apparatus for transmitting and receiving a dynamic multi-mode service and method for providing a dynamic multi-mode service according to the present invention are not limitedly applied to the configurations and operations of the above-described embodiments, but all or some of the embodiments may be selectively combined and configured, so that the embodiments may be modified in various ways.

What is claimed is:

1. A method for providing a dynamic multi-mode service, in which an apparatus for transmitting the dynamic multi-mode service and an apparatus for receiving the dynamic multi-mode service are used, the method comprising:
generating, by the apparatus for transmitting the dynamic multi-mode service, signaling information that includes information about linkage between switching channels through which the dynamic multi-mode service is provided, based on broadcast schedule information about a broadcast service, the information about linkage between switching channels including linkage type information that determines a switching operation of the switching channels;
transmitting, by the apparatus for transmitting the dynamic multi-mode service, the signaling information and the broadcast service to the apparatus for receiving the dynamic multi-mode service through at least one of a broadcast network and a broadband network;
receiving, by the apparatus for receiving the dynamic multi-mode service, the signaling information and the broadcast service in order to provide the dynamic multi-mode service;
interpreting, by the apparatus for receiving the dynamic multi-mode service, the information about the linkage between switching channels, which is included in the signaling information, by decoding the signaling information; and
providing, by the apparatus for receiving the dynamic multi-mode service, the broadcast service by performing dynamic channel switching based on the information about the linkage between switching channels,
wherein providing the broadcast service comprises:
providing a first broadcast service of the-an original service channel based on the broadcast schedule information;
providing a second broadcast service by switching the original service channel to a target service channel based on a first information about linkage during a provision of the first broadcast service or after a termination of the first broadcast service; and
providing a third broadcast service by switching the target service channel to the original service channel based on a second information about linkage after a termination of the second broadcast service,
wherein the information about linkage is set to one of linkage types including a first linkage type indicating channel switching based on user agreement and a second linkage type indicating automatic channel switching,
wherein the first information about linkage is set to the first linkage type and the second information about linkage is set to the second linkage type, and
wherein the apparatus for receiving the dynamic multi-mode service uses the information about linkage between switching channels when an-the original service channel is switched to a-the target service channel as the dynamic multi-mode service is provided during a certain period of time or when the target service channel is switched back to the original service channel as the dynamic multi-mode service is terminated,
wherein the signaling information includes User Service Bundle Description (USBD) of Service Level Signaling (SLS) information,
wherein the information about linkage is included in the USBD, and
wherein providing the second broadcast service is configured to switch the original service channel to the target service channel that is providing the second broadcast service, corresponding to the first broadcast service of the original service channel, depending on the linkage type information based on the information about the linkage between switching channels when the termination of the first broadcast service of the original service channel is confirmed based on the broadcast schedule information or when a user selection for channel switching is confirmed while the first broadcast service is provided,
wherein generating the signaling information is configured such that one or more service switching points of the broadcast service are set in the information about the linkage between switching channels in order to switch the original service channel, which is currently being viewed, to the target service channel and to then provide the broadcast service of the target service channel so as to start from a preset point.

2. The method of claim 1, wherein generating the signaling information is configured such that the information about the linkage between switching channels in a form of an XML element is added to the USBD of the signaling information.

3. The method of claim 2, wherein generating the signaling information is configured to define the linkage type information, through which a program that is being provided on the original service channel continues to be provided on the target service channel without interruption, in the information about the linkage between switching channels.

4. The method of claim 1, wherein generating the signaling information is configured such that the linkage type information between the target service channel and one or more multi-view channels, through which the one or more multi-view channels are made subordinate to the target service channel, is defined in the information about the linkage between switching channels in order to provide a multi-view service through the one or more multi-view channels subordinate to the target service channel.

5. The method of claim 1, wherein generating the signaling information is configured to set the one or more service-switching points between a starting point of the broadcast service and a service connection point based on at least one of a program number of the broadcast service and an attribute value specified in meta content.

6. The method of claim 1, wherein providing the third broadcast service is configured to switch the target service channel to the original service channel depending on the linkage type information based on the information about the linkage between switching channels when termination of the second broadcast service of the target service channel is confirmed based on the broadcast schedule information.

7. The method of claim 6, wherein providing the third broadcast service is configured such that, when two or more original service channels, to which the target service channel is capable of being switched, are present, any one channel is selected from among the two or more original service channels based on the information about the linkage between switching channels.

8. The method of claim 7, wherein providing the second broadcast service is configured such that, when two or more target service channels, to which the original service channel is to be switched, are present, second broadcast services, corresponding to the two or more target service channels, are provided on a single target service channel.

9. The method of claim 8, wherein providing the second broadcast service is configured such that, when the two or more target service channels, to which the original service channel is to be switched, are present, any one of the target service channels is set as a base channel, multiple broadcast services are selected from among broadcast services of the one or more remaining target service channels, and the selected multiple broadcast services are simultaneously provided as the second broadcast service on the base channel.

10. The method of claim 9, wherein providing the second broadcast service is configured to provide a multi-view service by generating one or more multi-view channels so as to be subordinate to the target service channel based on the information about the linkage between switching channels when the second broadcast service of the target service channel provides the multi-view service.

11. The method of claim 10, wherein providing the second broadcast service is configured to switch the one or more multi-view channels to the target service channel by delivering the information about the linkage between switching channels to the one or more multi-view channels when the second broadcast service of the target service channel, which provides the multi-view service, is terminated.

12. The method of claim 11, wherein providing the second broadcast service is configured such that the linkage type information of the information about the linkage between switching channels is set to a service replacement linkage type and is then delivered to the multi-view channels in order to switch the multi-view channels to the target service channel when the second broadcast service of the target service channel, which provides the multi-view service, is terminated.

13. The method of claim 12, wherein providing the second broadcast service is configured such that, when the second broadcast service of the target service channel, which provides the multi-view service, is terminated, the one or more multi-view channels are eliminated based on the information about the linkage between switching channels, in which the service replacement linkage type is set, and are automatically switched to the target service channel.

14. The method of claim 13, wherein providing the second broadcast service is configured to check one or more service-switching points set in the second broadcast service of the target service channel.

15. The method of claim 14, wherein providing the second broadcast service is configured such that, when one or more service connection points are set in the second broadcast service of the target service channel, the original service channel is switched to the target service channel and the second broadcast service is provided so as to start from any one of the one or more service-switching points.

16. An apparatus for transmitting a dynamic multi-mode service, comprising:
a broadcast schedule generation unit for generating broadcast schedule information about a broadcast service;
a signaling information generation unit for generating signaling information, which includes information about linkage between switching channels through which the dynamic multi-mode service is provided, based on the broadcast schedule information, the information about linkage between switching channels including linkage type information that determines a switching operation of the switching channels; and
a signaling information transmission unit for transmitting the signaling information and the broadcast service through at least one of a broadcast network or a broadband network,
wherein an apparatus for receiving the dynamic multi-mode service provides a first broadcast service of the-an original service channel based on the broadcast schedule information, a second broadcast service by switching the original service channel to a target service channel based on a first information about linkage during a provision of the first broadcast service or after a termination of the first broadcast service, and a third broadcast service by switching the target service channel to the original service channel based on a second information about linkage after a termination of the second broadcast service,
wherein the information about linkage is set to one of linkage types including a first linkage type indicating channel switching based on user agreement and a second linkage type indicating automatic channel switching,
wherein the first information about linkage is set to the first linkage type and the second information about linkage is set to the second linkage type,
wherein an apparatus for receiving the dynamic multi-mode service uses the information about linkage between switching channels when an original service channel is switched to a target service channel as the dynamic multi-mode service is provided during a certain period of time or when the target service channel is switched back to the original service channel as the dynamic multi-mode service is terminated,
wherein the signaling information includes User Service Bundle Description (USBD) of Service Level Signaling (SLS) information,
wherein the information about linkage is included in the USBD, and wherein the apparatus for receiving the dynamic multi-mode service switches the original service channel to the target service channel that is providing the second broadcast service, corresponding to the first broadcast service of the original service channel, depending on the linkage type information based on the information about the linkage between switching channels when the termination of the first broadcast service of the original service channel is confirmed based on the broadcast schedule information or when a user selection for channel switching is confirmed while the first broadcast service is provided,
wherein generating the signaling information is configured such that one or more service-switching points of the broadcast service are set in the information about the linkage between switching channels in order to switch the original service channel, which is currently being viewed, to the target service channel and to then provide the broadcast service of the target service channel so as to start from a preset point.

17. An apparatus for receiving a dynamic multi-mode service, comprising:
a media service reception unit for receiving signaling information, in which information about linkage between switching channels through which the dynamic multi-mode service is provided is included, and a broadcast service in order to provide the dynamic multi-mode service, the information about linkage between switching channels including linkage type information that determines a switching operation of the switching channels;

a linkage information interpretation unit for interpreting the information about the linkage between the switching channels, included in the signaling information, by decoding the signaling information; and a media service-processing unit for providing a broadcast service by switching channels of the dynamic multi-mode service based on the information about the linkage between switching channels, wherein the media service-processing unit is configured to:

provide a first broadcast service of the-an original service channel based on the broadcast schedule information;

provide a second broadcast service by switching the original service channel to a target service channel based on a first information about linkage during a provision of the first broadcast service or after a termination of the first broadcast service; and provide a third broadcast service by switching the target service channel to the original service channel based on a second information about linkage after a termination of the second broadcast service, wherein the information about linkage is set to one of linkage types including a first linkage type indicating channel switching based on user agreement and a second linkage type indicating automatic channel switching, wherein the first information about linkage is set to the first linkage type and the second information about linkage is set to the second linkage type, wherein the apparatus for receiving the dynamic multi-mode service uses the information about linkage between switching channels when an original service channel is switched to a target service channel as the dynamic multi-mode service is provided during a certain period of time or when the target service channel is switched back to the original service channel as the dynamic multi-mode service is terminated, wherein the signaling information includes User Service Bundle Description (USBD) of Service Level Signaling (SLS) information, and wherein the information about linkage is included in the USBD, and wherein the media service-processing unit switches the original service channel to the target service channel that is providing the second broadcast service, corresponding to the first broadcast service of the original service channel, depending on the linkage type information based on the information about the linkage between switching channels when the termination of the first broadcast service of the original service channel is confirmed based on the broadcast schedule information or when a user selection for channel switching is confirmed while the first broadcast service is provided, wherein generating the signaling information is configured such that one or more service-switching points of the broadcast service are set in the information about the linkage between switching channels in order to switch the original service channel, which is currently being viewed, to the target service channel and to then provide the broadcast service of the target service channel so as to start from a preset point.

\* \* \* \* \*